United States Patent
Cho et al.

(10) Patent No.: US 9,848,376 B2
(45) Date of Patent: Dec. 19, 2017

(54) METHOD AND APPARATUS FOR SELECTING DOMAIN SERVICE IN WIRELESS COMMUNICATION SYSTEM

(71) Applicant: Samsung Electronics Co., Ltd., Gyeonggi-do (KR)

(72) Inventors: Song Yean Cho, Seoul (KR); Sang Soo Jeong, Gyeonggi-do (KR); Han Na Lim, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/371,994

(22) PCT Filed: Jan. 11, 2013

(86) PCT No.: PCT/KR2013/000250
§ 371 (c)(1),
(2) Date: Jul. 11, 2014

(87) PCT Pub. No.: WO2013/105816
PCT Pub. Date: Jul. 18, 2013

(65) Prior Publication Data
US 2015/0049668 A1   Feb. 19, 2015

Related U.S. Application Data

(60) Provisional application No. 61/585,356, filed on Jan. 11, 2012, provisional application No. 61/588,858,
(Continued)

(51) Int. Cl.
*H04W 76/00* (2009.01)
*H04W 48/18* (2009.01)
(Continued)

(52) U.S. Cl.
CPC ........... *H04W 48/18* (2013.01); *H04M 7/006* (2013.01); *H04W 60/00* (2013.01); *H04W 76/02* (2013.01); *H04W 76/026* (2013.01)

(58) Field of Classification Search
CPC ............. H04W 36/0022; H04W 36/08; H04W 84/045; H04L 12/6418; H04L 2012/6475; H04L 65/1016; H04L 65/1073
(Continued)

(56) References Cited

U.S. PATENT DOCUMENTS 6,411,811 B2   6/2002 Kingdon et al.
8,086,238 B1 * 12/2011 Kosar .................. H04W 8/065
                                                       455/433
(Continued)

OTHER PUBLICATIONS

International Search Report dated Apr. 26, 2013 in connection with International Patent Application No. PCT/KR2013/000250, 5 pages.
(Continued)

*Primary Examiner* — Sai Aung

(57) ABSTRACT

According to an embodiment, a network access method of a user equipment (UE) in a communication system comprises the steps of: receiving information including an access order from a configuration server; storing the received information; and transmitting an access request to the network according to an access method determined on the basis of the stored information. According to another embodiment, a UE for accessing a wireless communication system comprises: a transceiving unit which receives information including an access order from a configuration server; and a control unit for storing the received information and controlling the transceiving unit to transmit an access request to the network according to an access method determined on the basis of the stored information. According to an embodiment of the present disclosure, when a UE for supporting a PS network and a CS network accesses a network, the UE receives a
(Continued)

configuration of each domain registration method in advance, and thus can more easily access each network. In addition, according to another embodiment of the present disclosure, message transmission can be more easily achieved between a system in which a long SMS message can be transmitted and a system in which a SMS message of conventional-length is transmitted. Furthermore, according to another embodiment of the present disclosure, when a UE, which has performed a CS fallback, returns to a 4G network due to the end of a CS service, the UE can be prevented from returning to another provider network since the UE has existing return information.

12 Claims, 12 Drawing Sheets

Related U.S. Application Data filed on Jan. 20, 2012, provisional application No. 61/592,546, filed on Jan. 30, 2012.

(51) Int. Cl.
*H04W 60/00* (2009.01)
*H04M 7/00* (2006.01)
*H04W 76/02* (2009.01)

(58) Field of Classification Search
USPC ...... 370/328, 331, 352; 455/433, 435.1, 434
See application file for complete search history.

(56) References Cited

U.S. PATENT DOCUMENTS

| | | | |
|---|---|---|---|
| 2005/0025134 A1* | 2/2005 | Armistead | H04L 12/5692 370/352 |
| 2005/0261017 A1* | 11/2005 | Vaittinen | H04W 52/286 455/522 |
| 2009/0093249 A1* | 4/2009 | Zhu | H04W 8/06 455/433 |
| 2009/0116447 A1* | 5/2009 | Balasubramanian | H04W 36/14 370/331 |
| 2009/0135811 A1* | 5/2009 | Huang | H04L 12/6418 370/352 |
| 2010/0151858 A1* | 6/2010 | Brisebois | H04W 24/10 455/434 |
| 2013/0235740 A1* | 9/2013 | Kim | H04W 24/04 370/252 |

OTHER PUBLICATIONS

Written Opinion of International Searching Authority dated Apr. 26, 2013 in connection with International Patent Application No. PCT/KR2013/000251, 4 pages.

Batchuluun Burentugs, et al., "Enhanced Class-based Fair Queuing Scheme for Ethernet Passive Optical Network", Inc, 2005, Fifth International Network Conference, Doryssa Bay Resort, Samos Island, Greece, 10 pages.

* cited by examiner

METHOD AND APPARATUS FOR SELECTING DOMAIN SERVICE IN WIRELESS COMMUNICATION SYSTEM

CROSS-REFERENCE TO RELATED APPLICATION(S)

The present application claims priority under 35 U.S.C. §365 to International Patent Application No. PCT/KR2013/000250 filed Jan. 11, 2013, entitled "METHOD AND APPARATUS FOR SELECTING DOMAIN SERVICE IN WIRELESS COMMUNICATION SYSTEM". International Patent Application No. PCT/KR2013/000250 claims priority under 35 U.S.C. §365 and/or 35 U.S.C. §119(e) to U.S. Provisional Patent Application Nos. 61/585,356 filed Jan. 11, 2012, 61/588,858 filed Jan. 20, 2012, and 61/592,546 filed Jan. 30, 2012, and which are incorporated herein by reference into the present disclosure as if fully set forth herein.

TECHNICAL FIELD

The present disclosure relates to a technology of registration with Packet Switched (PS) network and Circuit Switched (CS) network and, in particular, to a method and apparatus of registering a terminal with the network depending on the communication mode supported by the network.

Also, the present disclosure relates to a message transmission method and apparatus dependent on the communication mode supported by the network.

Also, the present disclosure relates to a method and apparatus for a terminal to switch between communication modes in a wireless communication system supporting a plurality of networks.

BACKGROUND ART

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

In line with such requirements, standardization for a Long Term Evolution (LTE) system, as one of the next-generation mobile communication systems, is underway in the $3^{rd}$ Generation Partnership Project (3GPP). LTE is a technology for realizing high-speed packet-based communications with the data rate of up to 100 Mbps, which is higher than the currently available data rate, and its standardization is almost complete. In order to accomplish the aim, a discussion is being held on several schemes: one scheme for reducing the number of nodes located in a communication path by simplifying a configuration of the network, and another scheme for maximally approximating wireless protocols to wireless channels.

FIG. 1 is a diagram illustrating the general LTE mobile communication system architecture.

Referring to FIG. 1, the radio access network of the LTE mobile communication system includes an evolved Node B (hereinafter, referred to as eNB, Node B, and E-UTRAN interchangeably) 10, Mobility Management Entity (MME) 120, Serving Gateway (SGW) 30. The User Equipment (UE) 10 connects to an external network through the eNB, SGW, and PDN Gateway (PGW).

The eNB 110 is a Radio Access Network (RAN) node and corresponds to RNC of UTRAN system and BSC of GERAN system. The eNB 110 is connect to the UE 100 through radio channel and performs the role similar to the legacy RNC/BSC. The eNB may manage a plurality of cells simultaneously.

In LTE, all the user traffics including the real time service such as Voice over IP (VoIP) are serviced through a shared channel and thus there is a need of a device for gathering the state informations of UEs and scheduling the UEs, eNB being responsible for this.

The MME 120 is an entity responsible for various control functions and may be connected to a plurality of eNBs.

The SGW 130 is an entity capable of establishing and releasing data bearers under the control of the MME 120.

The Application Function (AF) 140 is an entity capable of exchanging application information with the UE at the application level.

The Policy Charging and Rules Function (PCRF) 150 is an entity of controlling Quality of Service (QoS) policy and providing the PGW 160 with Policy And Charging Control (PCC) rule. The PCRF 150 is an entity of controlling the QoS and billing for the traffic. Meanwhile, the term "User Plane (UP)" denotes a path established by connecting UE 100, RAN node 110, SGW 130, and PGW 160 for user data transmission. On this path, the link between the UE 100 and the RAN node 110 is established through a radio channel most significantly restricted in terms of resource.

In the radio communication system such as LTE, QoS is applied per EPS bearer. One EPS bearer is used for IP flows requiring the same QoS. An EPS may have QoS-related parameters designated such as QoS Class Identifier (QCI) and Allocation and Retention Priority (ARP). The QCI is a parameter defining QoS priority with an integer value, and the ARP is a parameter for use in determining whether to accept or reject establishment of a new EPS bearer.

The EPS bearer corresponds to the PDP context of the GPRS system. An EPS bearer belongs to a PDN connection which may have Access Point Name (APN) as a property. In the case establishing a PDN connection for IMS server such as VoLTE, the PDN connection has to be established using a well-known IMSAPN.

In order to support voice communication in the LTE network, it is possible to adopt the IMS-based VoLTE in Packet Switched (PS) mode or the CS Fall Back (CSFB) reusing the Circuit Switched (CS) mode of the 2G/3G system. VoLTE is a term used in LTE network in the same concept as Voice over IMS (VoIMS).

Typically, the UE is equipped with a function capable of supporting both the CS and PS services. If the network system supports the combined procedure, the UE is capable of being registered with the PS and CS domains simultaneously through a single registration (attach or RAU/TAU) procedure. Otherwise if the network system does not support the combined procedure (e.g., NMO II/III network), the UE has to perform the registration procedure with the PS and CS, respectively.

The LTE (E-UTRAN) system incompatible with CS function uses the interface called SGs for MME and MSC to provide the UE with the CS-based service (voice communication, SMS, etc.). Since the SGs interface is optional for the network operator, the user cannot receive the CS service in the LTE network which does not support the SGs interface.

Although it is typical that the small data transfer service such as SMS is provided through CS domain, PS network-based small size data transfer service functions have been introduced to reduce the CS network maintenance costs. Independently of this, new small data transfer services using a generic format capable of containing relatively large data has been introduced to mitigate the restriction in data size of the legacy SMS. The generic format small data transfer function is also optional for the operator. As a consequence, it may occurs that the UE which is in the state of receiving the new generic format small data transfer service roams to another network which does not supporting the new generic format small data transfer service or vice versa. Also, it may occurs that a UE connected to an operator network supporting the new generic format small data transfer service attempts small data transfer to another UE connected to another operator network not supporting the new generic format small data transfer service or vice versa.

DISCLOSURE OF INVENTION

Technical Problem

The present disclosure has been conceived to solve the above problem and aims to provide a method and apparatus for registering a terminal with PS and CS domains.

Also, the present disclosure aims to provide a method and apparatus for transmitting a message in a communication mode supported by the network.

Also, the present disclosure aims to provide a method and apparatus for switching between communication modes of a terminal in a system supporting a plurality of networks.

Solution to Problem

In accordance with an aspect of the present disclosure, a network connection method of a terminal in a communication system includes receiving information including a registration order from a configuration server, storing the received information, and transmitting a connection request to a network according to a connection mode determined based on the stored information.

In accordance with another aspect of the present disclosure, a terminal connecting to a wireless communication system includes a transceiver which receives an information including a registration order from a configuration server and a controller which stores the received information and controls the transceiver to transmit a connection request to a network according to a connection mode determined based on the stored information.

In accordance with another aspect of the present disclosure, a communication method of a terminal in a communication system includes transmitting/receiving signals a first communication domain, determining communication in a second communication domain different from the first communication domain, transmitting a message including location information of the terminal and information on the first communication domain through the network of the first communication domain, and receiving a list including an order of communication domains to which the terminal can connect based on the message from the network.

In accordance with still another aspect of the present disclosure, a terminal of a communication system includes a transceiver which transmits and receives signals in a first communication domain and a controller which determines communication in a second communication domain different from the first communication domain, wherein the transceiver transmits a message including location information of the terminal and information on the first communication domain through the network of the first communication domain and receives a list including an order of communication domains to which the terminal can connect based on the message from the network.

Advantageous Effects of Invention

The domain service selection apparatus and method of the present disclosure is capable of facilitating registration of a terminal supporting PS and CS domain services with the respective domains.

The domain service selection apparatus and method of the present disclosure is capable of relaying messages between a system supporting a relatively long SMS message and a system supporting legacy SMS message.

The domain service selection apparatus and method of the present disclosure is capable of preventing the a terminal completed CS fallback from attaching other operator's network rather than its home network, when returning to the 4G network, due to the preservation of the old fallback information.

MODE FOR THE INVENTION

Figure 1:
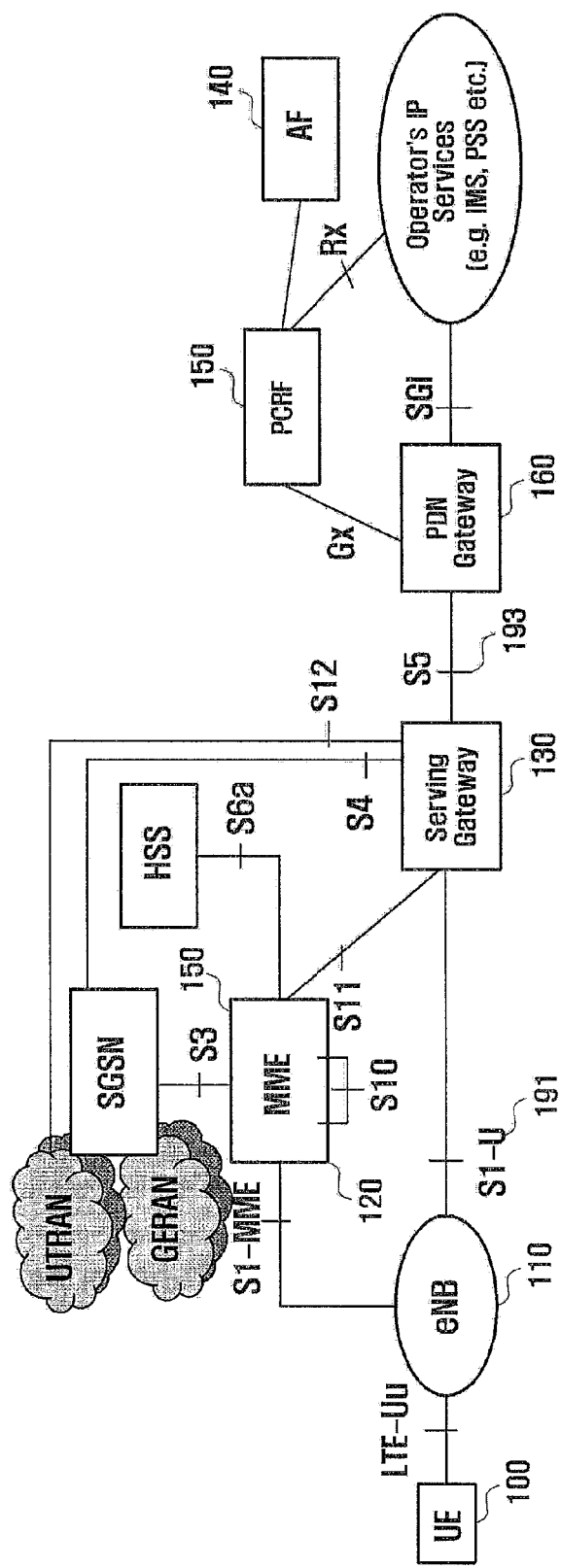
FIG. 1 is a diagram illustrating the general LTE mobile communication system architecture.

Exemplary embodiments of the present disclosure are described with reference to the accompanying drawings in detail.

Detailed description of well-known functions and structures incorporated herein may be omitted to avoid obscuring the subject matter of the present disclosure. This aims to omit unnecessary description so as to make the subject matter of the present disclosure clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

In the following description, User Equipment (UE) may be referred to as 'user.' A network may include a plurality of entities for providing the UE with radio communication service. The network may be referred to as 'operator network' or 'service.'

Figure 2:
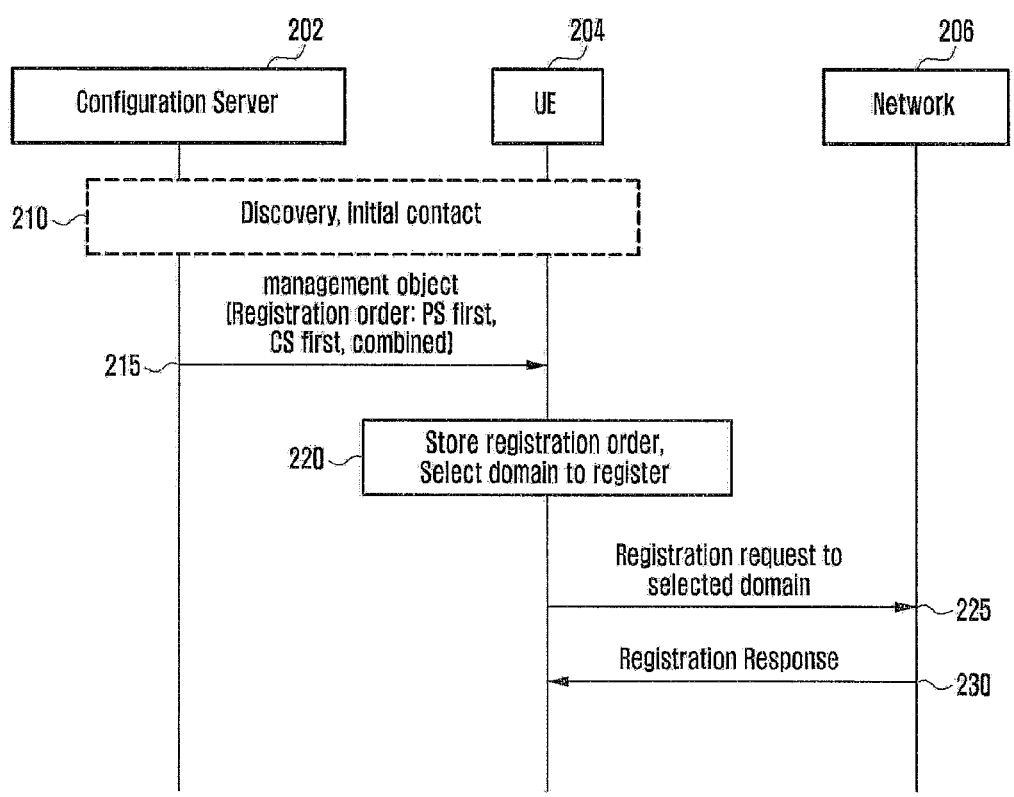
FIG. 2 is a signal flow diagram illustrating network registration order configuration procedure among the UE, server, and network according to an embodiment of the present disclosure.

FIG. 2 is a signal flow diagram illustrating network registration order configuration procedure among the UE, server, and network according to an embodiment of the present disclosure.

Referring to FIG. 2, if the UE 204 supports both the PS and CS functions, it has to determine the domain type and order for performing the registration procedure depending on the intended service and whether the provider network 206 supports the combined procedure.

For example, if the provider network 206 supports the PS-based SMS transmission function while the UE 204 requests for only the PS data and SMS services, the user 204 is not necessary to be registered with the CS domain. In this case, if the UE 204 is registered with the CS domain and then the PS domain, the CS domain registration may be an unnecessary procedure.

If the provider network 206 does not support PS network-based SMS transmission function, the UE 204 is not necessary to perform CS domain registration procedure.

According to an embodiment, the Configuration Server 202, the UE 204, and the network 206 may exchange signals.

The UE 204 may perform at least one of discovery and initial attach procedures at operation 210. According to an embodiment, the UE 204 may turn on and start initial attach to the configuration server 202 in the discovery and initial attach procedures. In the case that the UE 204 served by a network moves to a service area of another provider, it may performs the process of operation 210 through communication with the configuration server 202 of the network 260 in the corresponding area. In an embodiment, the configuration server may be at least one of an OMA-DM server and OTA server. In an embodiment, the UE 204 may receive a message from the configuration server 202 in the initial attach and perform at least one of discovery and initial contact. According to an embodiment, the configuration server may know which of the CS and PS the network supports. In more detail, the configuration server 202 and the network 206 exchange messages such that the network 206 notifies the configuration server 202 of the domain which the network 206 supports. The configuration server 202 may configure the connection priorities of the CS and PS domains according to the operator's preference.

At operation 215, the configuration server 202 may send the UE 204 a management object based on the result of operation 210. The management object may include the PS and CS domain registration order. The registration order may include information on the domain to connect with priority or simultaneous connection supportability. In an embodiment, the UE may store the management object per operator or configure the management object per operator depending on the network to connect.

At operation 220, the UE 204 may store the registration order received at operation 215 and select the domain to register according to the registration order. According to an embodiment, the registration order may be configured through OMA-DM or OTA procedure. On the basis of this configuration, the UE 204 determines whether to attach first to the PS domain or CS domain or perform combined attach.

At operation 225, the UE 204 may request the network 206 for registration based on the selection at operation 220.

According to an embodiment, it is possible to perform the PS domain-preferred attach, CS domain-preferred attach, or both combined attach.

At operation 230, the network 206 may send the UE 204 a Registration Response message in response to the request received at operation 225.

In an embodiment, if the UE 204 request for PS registration, the network 206 may transmit the response message including a list of the functions supported in the PS domain. These functions may include at least one of SMS transmission, voice communication, and MTC-specific function. The UE 204 may determine whether to request for CS domain registration based on the response message. The network 206 may provide extra information indicating the area to which the functions supported in the PS domain is applicable. This is described later with reference to FIG. 4.

Figure 3:
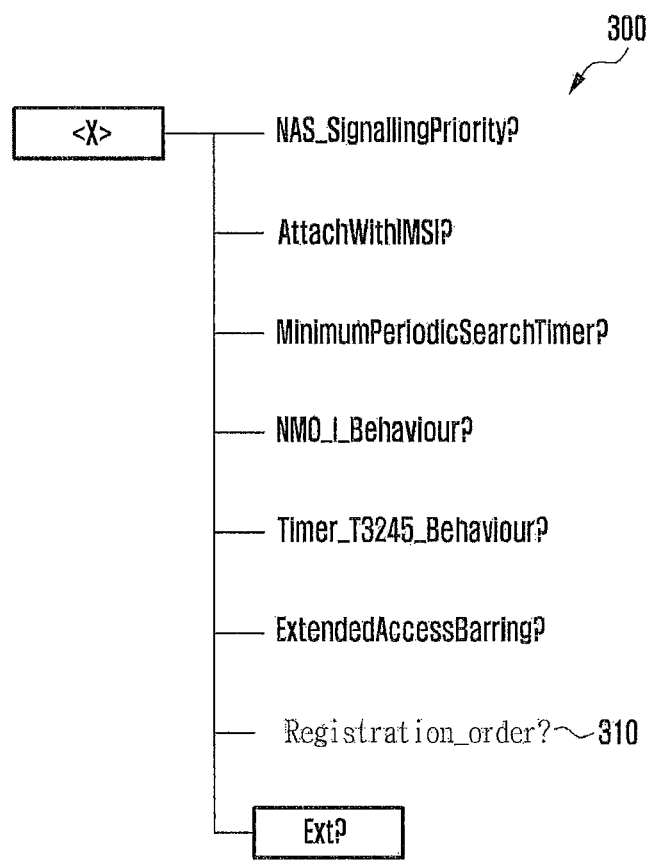
FIG. 3 is a diagram illustrating a management structure for configuring registered domains of the UE according to an embodiment of the present disclosure.

FIG. 3 is a diagram illustrating a management structure for configuring registered domains of the UE according to an embodiment of the present disclosure.

Referring to FIG. 3, the management structure 200 for the operator to configure registered domains of the UE dynamically is exemplified as follows. The NAS configuration MO transferred from the 3GPP operator server to the UE is formed as follows and may be delivered through OMA_DM or OTA Registration_order leaf 310 defines the domain registration order for the UE to perform registration and, if this is received, the UE performs the registration procedure in the order. Detailed meaning and operation are as follows.

<X>/Registration_order

The Registration_order leaf indicates a domain which will be registered first by a UE.

Occurrence: ZeroOrOne

Format: int

Access Types: Get, Replace

Values: <Registration order>

Available table values are as follows, and the configuration value-based operation configuration may vary depending on the embodiment. In the case of being set to 1, it is possible be registered with the PS domain first, and this may be changed in the range applicable by those skill in the art.

TABLE 1

| Value | Description |
|-------|-------------|
| 0 | CS first |
| 1 | PS first |
| 2 | Combined first |
| 3-255 | Reserved |

According to an embodiment, if the UE is configured to perform registration with PS first, the UE attempts attach to the PS domain first and, if necessary (e.g., if it is impossible to use SMS or voice communication in the PS domain), may attempt registration with the CS domain.

Figure 4:
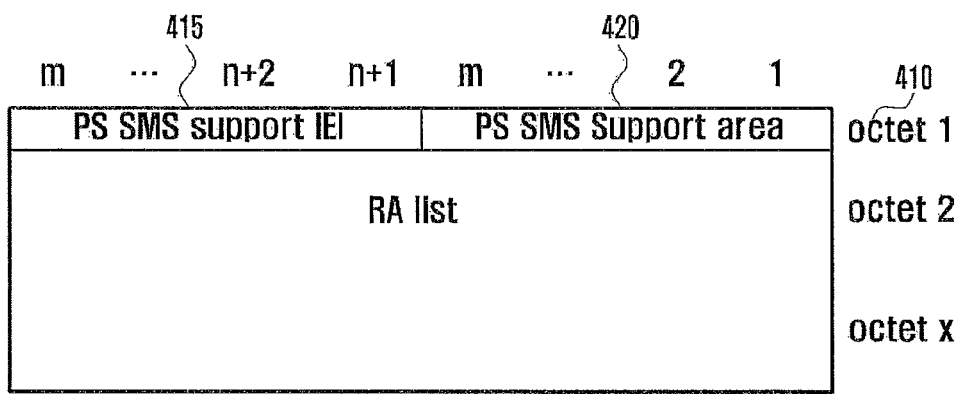
FIG. 4 is a diagram illustrating exemplary supplementary information provided from the network to the UE.

FIG. 4 is a diagram illustrating exemplary supplementary information provided from the network to the UE.

Referring to FIG. 4, the supplementary information includes the information indicating whether the PS domain-based SMS function is applicable in a set of specific RAs. The supplementary information also may include at least one of PS SMS Support IEI 415 and PS SMS Support area 420. The PS SMS Support area may include 'Not support' 425, specific Routing Area 430, and entire PLMN 435.

Although the description has been made with SMS, PS domain, and RA, it is obvious that any information on specific service/function, applied domain, and applied area can be provided to the UE. If such information is received, the UE which is out of the area to which the corresponding function is applied may determine whether to perform extra registration procedure.

Figure 5:
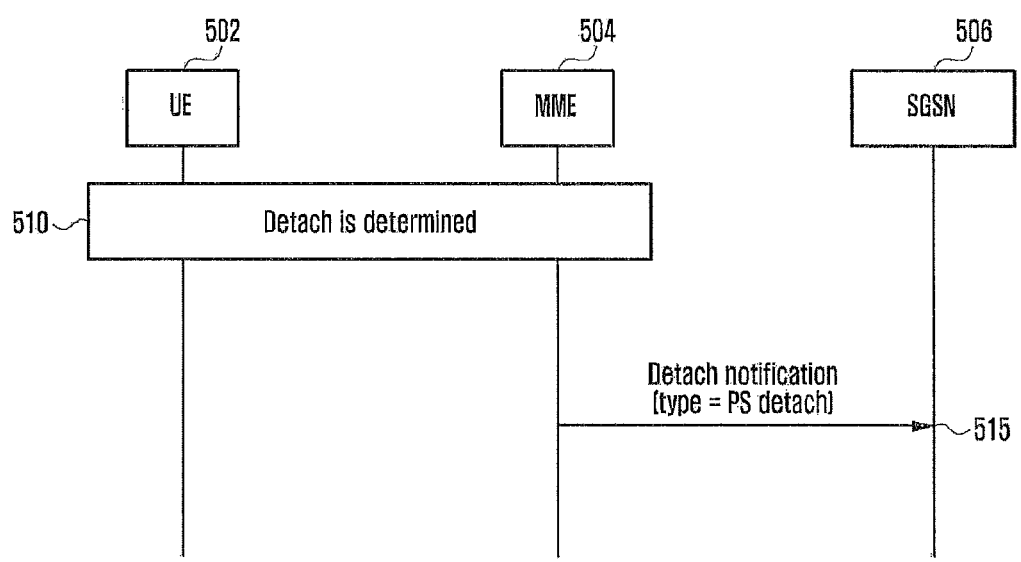
FIG. 5 is a diagram illustrating the detach procedure of the UE according to an embodiment.

FIG. 5 is a diagram illustrating the detach procedure of the UE according to an embodiment.

Referring to FIG. 5, the SGs function requires reconfiguration of the operator network and thus may be restricted depending on the operator. This embodiment is directed to the case where the operator operates LTE and 2G/3G networks and does not support SGs. The operator network supports the voice service and aforementioned small data transfer service through PS domain in LTE network and CS domain in 2G/3G network.

In an embodiment, the UE 502 has to attach to the PS domain in the LTE network and to both the PS and CS domains in the 2G/3G network. In order to receives the service correctly in the 2G/3G network after being detached from the LTE network, the network and UE have to know that the UE has been detached from the LTE and it is necessary to use the CS domain in the 2G/3G network. If the UE using the SMS service has performed registration procedure for the PS domain but it is found out that the operator network does not support PS domain service, the UE cannot receive the SMS service.

At operation 510, the UE 502 and MME 504 may determine Detach based on the communication state.

At operation 515, the MME 504 may send the SGSN 506 a message notifying of Detach from the PS domain. The message is not restricted in format and, if the message is received, the SGSN is aware of the Detach of the UE 502 from the PS domain. In the case that the UE 502 is detached from the E-UTRAN (or the MME determine detach), the MME may sends the SGSN 506 the message including the information indicating that the UE is detached from the service through E-UTRAN. In the procedure, the detach notification message transmitted from the MME to the SGSN may include the information on detach cause and detach type.

The detach type indicates PS or EPC only detach, the SGSN 506 is aware that the UE 502 has been detached from only the PS domain. In this case, if the UE 502 has been registered with the CS domain, the SGSN 506 becomes aware that the UE is in the state of receiving only the CS domain service.

According to an embodiment, if the detach type indicates the PS and CS detach, the SGSN 506 becomes aware that the UE 502 has been detached completely and thus the CS service through MSC/VLR is not provided any more. In this case, if there is addition Gs association, there is no need of GS to the MSC/VLR any longer and thus the SGSN 506 notifies the UE 502 or MME 504 of the necessity of releasing Gs.

Figure 6:
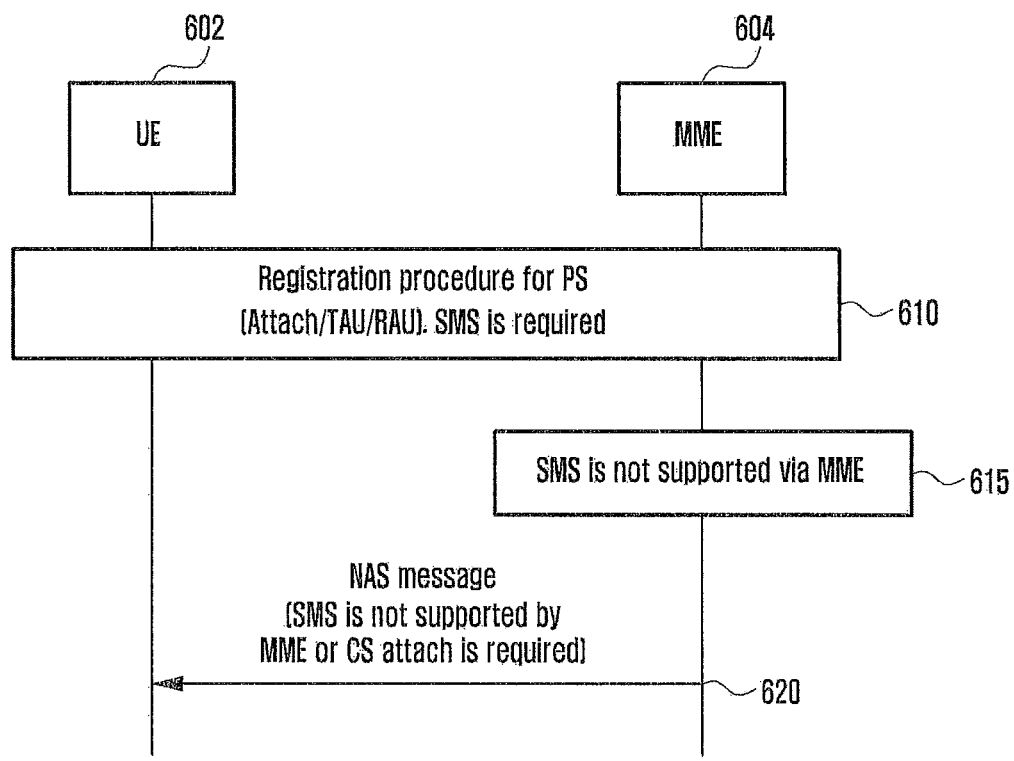
FIG. 6 is a diagram illustrating communication between the UE and MME according to an embodiment.

FIG. 6 is a diagram illustrating communication between the UE and MME according to an embodiment.

Referring to FIG. 6, the UE 602 performs a registration procedure for PS with the MME 604 at operation 610. This registration procedure may include at least one of Attach and TAU/RAU procedure and SMS service necessity information transmission procedure.

The MME 604 may determine that MME-assisted SMS is not supported at operation 615.

The MME 604 may send the UE 602 a NAS message notifying that it does not support SMS or a message indicating that CS Attach is required at operation 620. Depending on the embodiment, the NAS message may be replaced by other type of message and the message sent to the UE 602 may include the information indicating that nothing but the SMS service is supported.

Meanwhile, if it is determined that the corresponding domain cannot support any of the services requested by the UE 602 in the registration procedure with the domain, the operator network may send the UE the information on the supportability of specific services and notifying of the necessity of registration with the other domain. For example, the network with which the UE is registered for use of all services in the PS domain cannot support SMS through the PS domain, it has to notify the UE of this so as to prompt the UE to perform CS registration. In order to accomplish this, if the UE attempts Attach or RAU/TAU procedure, the SGSN/MME has to notify the UE whether it supports PS domain-based SMS. For example, if any of the services requested by the UE is not supported through PS domain, the core network nodes of the operator network send the UE a CS registration requirement indicator in order for the UE to perform CS domain registration.

Figure 7:
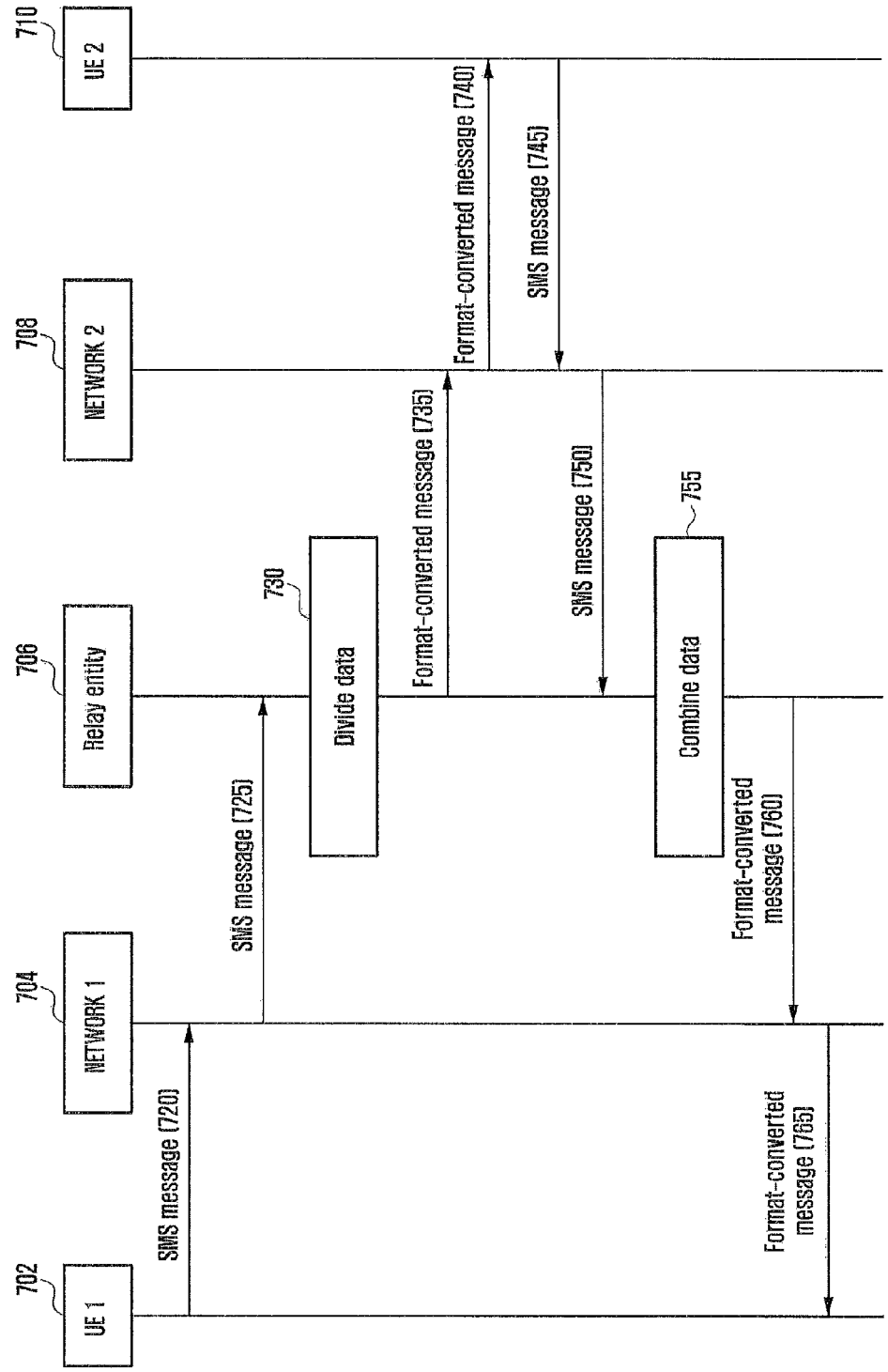
FIG. 7 is a diagram illustrating signal flows for message transmission between UEs according to an embodiment.

FIG. 7 is a diagram illustrating signal flows for message transmission between UEs according to an embodiment.

FIG. 7 shows the message exchange among the first UE 702, the first network 704, the relay entity 706, the second network 708, and the second UE 710.

SMS is size-constrained and thus restricted in usability. In order to mitigate the restriction, a new generic format small data transfer service may be proposed to carrying more data. The new generic format small data transfer service can be used when both the UE and the operator network support the service. Although the sender's UE and operator network support the service, if the receiver's UE and operator network do not support the service, the data size and format mismatches causes problem in reception.

In an embodiment, at least one of the first UE 702 and the first network 704 may support the enhanced SMS message. Accordingly, it is possible to transmit/receive a message longer than the legacy SMS message length limit at a time. In an embodiment, at least one of the second UE 710 and the second network 708 supports only the legacy SMS, it is impossible to transmit/receive a message longer than the legacy SMS message length limit at a time.

In an embodiment, the relay entity 706 may be a server relaying SMS as a component of the first network 704 or the second network 708. The relay entity 706 may process the messages to be relayed that are different size and format to be fit for delivery.

The first UE 702 may send the first network 704 an SMS message at operation 720. Depending on the embodiment, the SMS message may be the message which is not limited in length or format.

At operation 725, the first network 704 may transfer the SMS message received at operation 720 to the relay entity 706.

The relay entity 706 may convert the received message to a formation supported by at least one of the second network 708 and the second UE 710 at operation 730. According to an embodiment, the format conversion procedure may include dividing the message into at least two messages to fulfil the length requirement.

The relay entity 706 may send the message converted in formation to the second network 708 at operation 735.

At operation 740, the second network 708 may forward the message received at operation 735 to the second UE 710.

The second UE 710 may send the second network 708 a SMS message at operation 745. Depending on the embodiment, the SMS message may be the legacy SMS message restricted in size and format.

At operation 750, the second network 708 may send the SMS message received from the second UE 710 at operation 745 to the relay entity 706.

The relay entity 706 may convert the received message to a format supported by at least one of the first network 708 and the first UE 710. Depending on the embodiment, the format conversion may include combining two messages short in length as compared to the format supported by at least one of the first UE 702 and the first network 704.

The relay entity 706 may send the format-converted message to the first network 704 at operation 760.

The first network 704 may forward the received message to the first UE 702 at operation 765.

According to an embodiment, the formats and sizes of the messages supported by the UE and operator network of the small data sender and the UE and the operator network of the receiver are different, the intermediate entities of the network perform format conversion, fragmentation, and concatenation to solve the mismatch problem and perform successful data transmission. Although the description is made in consideration of the type of UE registered with the operator networks of the respective sender and receiver of the data for explanation convenience, the proposed technology is not limited to the formats of the sender and receiver (e.g., UE and server) and is applicable without significant change.

A. When Sender of Small Data Support New Generic Format

A.1 SMS-SC Perform Format Conversion

When the sender supports the new generic format and size but the receiver does not support the new generic format and size, the SMS-SC performs format conversion. The format conversion is briefed as follows.

1. The sending UE attempts small data transfer. The operator network supports new generic format and size.

2. The data is sent to the SMS-SC. The SMS-SC requests the database/server (e.g., HSS) storing the subscription information for information to know whether the receiver supports the new generic format and size or which format the receiver support for data transmission. This may be performed through a separate query and answer procedure or as a part of the small data transfer procedure (e.g., procedure of sending Route Information to know the registered location of the receiving UE). The SMS-SC also may determine this using the information preset/recorded in the UE and the operator network.

3. If the receiver supports the new generic format and size too, the SMS-SC forwards the data in the format as received. Otherwise, the SMS-SC converts data in consideration of the format and size supported by the receiver. For example, if the size of the data transmitted by the sender is greater than the maximum size supported by the receiver, the SMS-SC divides the received data into multiple small data for transfer to the receiver.

Although the above description has been directed to the format conversion based on the SMS-SC, the same operation may be embodied by GMSC, IW-MSC, or MTC-IWF. In any case, the procedure made up of sections 1 to 3 is applicable by substituting the corresponding entity for the SMS-SC.

A.2 MME Perform Format Conversion

If the sender of the small data supports the new generic format and size, the MME of the receiving side may determine and perform the format conversion.

1. The sending UE attempts small data transfer. The operator network supports the new generic format and size.

2. The MME of the receiving side receives the data. The MME knows whether the receiving UE supports the data transfer in new generic format and size or performs, if necessary, query procedure with the UE or requests the database (e.g., HSS) for the subscriber information on whether the receiving UE supports format conversion or new generic format data transfer.

3. If the UE supports the new generic format data, the MME forwards the received data to the UE. Otherwise, the MME performs format conversion on the received data. For example, if the size of the data transmitted by the sender is greater than the maximum size supported by the receiver, the MME divides the received data into multiple small data for transfer to the receiver.

Although the above description has been directed to the format conversion based on the MME, the same operation may be embodied by MSC or SGSN. In any case, the procedure made up of sections 1 to 3 is applicable by substituting the corresponding entity for the MME.

B. When Sender of Small Data do not Support New Generic Format

B.1 SMS-SC Perform Format Conversion

If the sender of the small data does not support the new generic formation and size, the SMS-SC performs format conversion. The format conversion is briefed as follows.

1. The sending UE attempts small data transfer. The UE or the operator network does not support the new generic format and size.

2. The data is set to the SMS-SC. The SMS-SC requests the database/server (e.g., HSS) storing the subscription information for information to know whether the receiver supports the new generic format and size or which format the receiver support for data transmission. This may be performed through a separate query and answer procedure or as a part of the small data transfer procedure (e.g., procedure of sending Route Information to know the registered location of the receiving UE). The SMS-SC also may determine this using the information preset/recorded in the UE and the operator network.

3. If does not support the new generic format and size, the SMS-SC forwards the data in the format as received. Otherwise, the MSs-SC converts the data in consideration of the format and size supported by the receiver. For example, if the size of the data the receiver can receive at a time is greater than the size of the data carried in a message transmitted by the sender, the SMS-SC combines multiple received data into one for transfer to the receiver.

Although the above description has been directed to the format conversion based on the SMS-SC, the same operation may be embodied by GMSC, IW-MSC, or MTC-IWF. In any case, the procedure made up of sections 1 to 3 is applicable by substituting the corresponding entity for the SMS-SC.

B.2 MME Perform Format Conversion

If the sender of the small data does not support the new generic format and size, the MME of the receiving side may determine and perform the format conversion.

1. The sending UE attempts small data transfer. The operator network does not support the new generic format and size.

2. The MME of the receiving side receives the data. The MME knows whether the receiving UE supports the data transfer in new generic format and size or performs, if necessary, query procedure with the UE or requests the database (e.g., HSS) for the subscriber information to know whether the receiving UE supports format conversion or new generic format data transfer.

3. If the UE does not support the new generic format data, the MME forwards the received data to the UE. Otherwise, the MME performs format conversion on the received data. For example, if the size of the data the receiver can receive at a time is greater than the size of the data carried in a message transmitted by the sender, the MME combines multiple received data into one for transfer to the receiver.

Although the above description has been directed to the format conversion based on the MME, the same operation may be embodied by MSC or SGSN. In any case, the procedure made up of sections 1 to 3 is applicable by substituting the corresponding entity for the MME.

C. User/Service Information Update Procedure

In order to determine whether the new generic format or legacy format data transfer is supported, there is a need of a subscriber information update or registration procedure.

C.1 Initial Registration Procedure

1. The UE performs attach or TAU/RAU/LAU with the network.

2. The core network (MME/SGSN/MSC) sends the subscriber information database/server (e.g., HSS) an attach/TAU/RAU/LAU request. This message includes small data transfer mode (PS or CS) and format/size information determined based on the UE capability and core network node capabilities.

3. The subscriber information database/server retains the information to respond to an inquiry from another entity.

C.2 Update Procedure

1. The small data format used by the UE is changed. The UE performs attach or TAU/RAU/LAU with the network.

2. The core network node (MME/SGSN/MSC) sends the subscriber information database/server (e.g., HSS) an attach/TAU/RAU/LAU request message. This message includes small data transfer mode (PS or CS) and format/size information determined based on the UE capability and core network node capabilities.

3. The subscriber information database/server retains the information to respond to an inquiry from another entity.

D. When Server and UE Communicate

If there is a need of small data communication between a server and a UE, there is adjustment of message format between two nodes.

D-1. Adjustment Between UE and Server Directly

1. The UE performs registration with the operator network.

2. The UE includes the information on the small data format and size it supports in the registration information transmitted to the server.

3. The server generates a message based on the information received at operation 2 and sends the message to the UE.

If the small data forma or size supported by the UE is changed (due to change of operator network or core network or UE settings), the UE performs operation 2 again to notify the server of the changed information.

D-2. MTC-IWF Handling Procedure

1. The server sends the small data to MTC-IWF.

2. The MTC-IWF receives the data. The MTC-IWF may know whether the receiving UE supports the new generic format and size data transfer or performs, if necessary, query procedure with the UE or requests the database (e.g., HSS) for the subscriber information on whether the receiving UE supports format conversion or new generic format data transfer.

3. The MTC-IWF sends the UE the message format and size adjusted, if necessary, based on the information received at operation 2.

Figure 8:
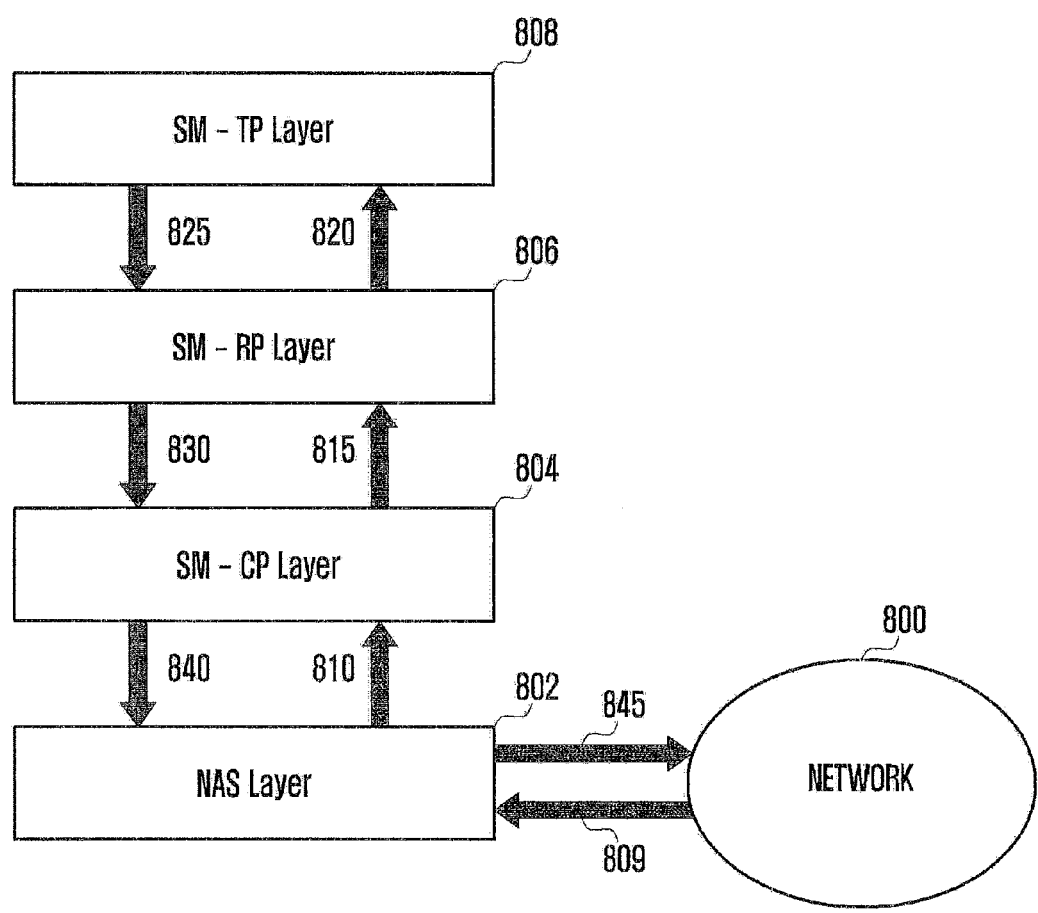
FIG. 8 is a diagram illustrating a layered message transmission method according to an embodiment.

FIG. 8 is a diagram illustrating a layered message transmission method according to an embodiment.

Referring to FIG. 8, a network 800 and a NAS layer 802 may communicate data. The data received at the NAS layer is delivered through an SM-CP layer 804, an SM-RP layer 806, and an SM-TP layer 808 in series as denoted by reference numbers 810, 815, and 820.

The SM-TP layer 808 sends the data to be transmitted to the NAS layer 802 through the SM-RP layer 806 and the SM-CP layer 804 as denoted by reference numbers 825, 830, and 840; and the NAS layer transmits to the message to the network 800 as denoted by reference number 845.

Since the SMS transmission is restricted in length, it is impossible to transmit the data longer than the legacy SMS message limit. Meanwhile, the legacy SMS transmission method users RP/CP layers 804 and 806 supporting data retransmission for reliable transmission. The RP/CP layers 804 and 806 have a shortcoming of not transmitting the data longer than the legacy SMS length limit. Also, the retransmission function of the RP and CP layers 804 and 806 may be cause unnecessary overhead in the sparse error environment.

A. Support of Elongated Small Data

A description is made of the method of expending the legacy SMS transmission method to carry longer data. Currently, the SMS-SUBMIT type or SMS-DELIVERY type of the SM-TP layer 808 has a TP User Data Length field. The User Data Length field may be set to a value equal to or less than 140. Due to the restriction of this value, the information amount supported by SMS is limited to 140 bytes. In order to release this limit, the SMS-SUBMIT type or SMS-DELIVERY type has an Extended Length field. If the data amount of an SMS message is less than 141 bytes, only the TP User Data Length field is used. Otherwise, both the TP User Data Length field and the new Extended Length field are included. If both the TP User Data Length field and Extended Length field are included, the entities determine the actual length of the data using the information contained in these two fields. For example, if the data longer than 141 bytes is received, the TP User Data Length field is set to 140 and the length of the rest data is indicated by the Extended Length field, or the TP User Data field is filled with all 1's to indicate the presence of the Extended Length field.

B. As aforementioned, the multi-layer protocols for SMS transmission have overlapped functions. Since such overlapped functions may not be used in a certain network configuration or environment, it may be proposed to transmit the SMS message without applying unnecessary protocol functions. One of the SM-RP layer 806 and the SM-CP layer 804 for SMS may be disabled in response to a request of a low layer (GMM, EMM, or MM). The GMM, EMM, or MM may be included in the NAS layer 802. The disabled of the SM-RP layer 806 and the SM-CP layer 804 may bypass the PDU transparently to the next layer.

C. If the length of the message supported by a specific layer is longer than the maximum length supported by a lower layer, it is impossible to transmit the message. Accordingly, the maximum length of the message generated by the upper layer should be determined based on the maximum length supported by the lower layer. In order to accomplish this, C-1. the lower layer (e.g., GMM, EMM, and MM) notifies the upper layer (e.g., SM-TP 808, SM-RP 806, SM-CP 804, and CM sublayer) of the maximum length of PDU it can transmit. If a layer notifies the next upper layer of the length information, the corresponding length may be applied and then notified to the next upper layer. The actual message lengths at the SM-TP layer 808, SM-RP layer 806, and SM-CP layer 804 are determined based on this information.

C-2. The lower layer (e.g., GMM, EMM, or MM) notifies the upper layer (e.g., SM-TP layer 808, SM-RP layer 806, SM-CP layer 804, and CM sublayer) of its message format. If a layer has notifies its upper layer of this information, this information may be applied and then notified to the next upper layer. The actual message sizes at the SM-TP layer 808, SM-RP layer 806, and SM-CP layers 804 are determined based on this information. For example, if the lower layer is the MM layer and if it is known that the MM layer has the maximum message length of 140 bytes, the upper layer may generates the message not longer than this.

Figure 9:
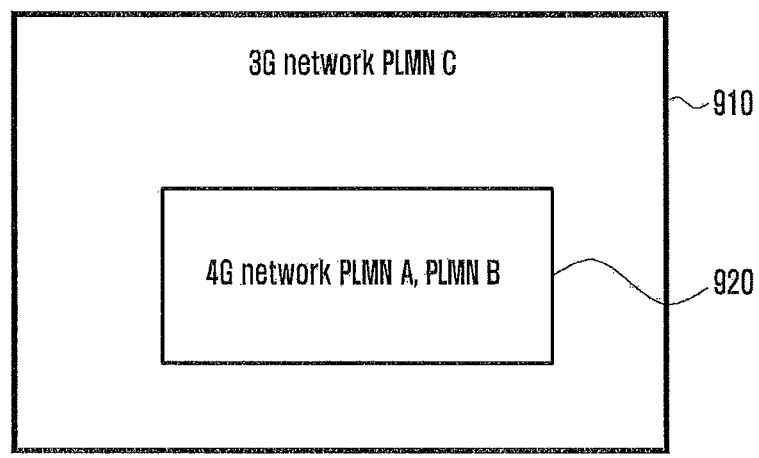
FIG. 9 is a diagram illustrating a network service structure according to an embodiment.

FIG. 9 is a diagram illustrating a network service structure according to an embodiment.

Referring to FIG. 9, the 2/3G network 910 providing CS service and the 4G network 920 proving only the PS service may be deployed in the same area.

In order to provide the users connected to the 4G network 920 with CS service, the operator may use CS Fallback (CSFB) connecting the UE to the 2/3G network 910 temporarily. In the network configuration supporting the CSFB, the UE connected to the 4G network 920 may fall back to the 2/3G network to receive the CS service and, when the CS service ends, return to the 4G network 920. At this time, the operators (i.e. PLMNs) before and the fallback to and after the return from the 2/3G network 910 may differ from each other, and this means occurrence of Attach failure and retry causing signaling waste or reduction of the number of users receiving the service, resulting in overload to the operator network.

Suppose that the 2/3G network 910 uses PLMN C and the 4G network 920 is shared by PLMN A and PLMN B. If the UE connected to 4G network 920 via a specific PLMN (e.g. PLMN A) switches to the 2/3G network 910 through CSFB and then returns to the 4G network 920 after the end of the CS service, it is preferred to continue receiving the service via the previously used PLMN (i.e. PLMN A) as far as possible.

When the UE returns to the 4G network 920 after the end of CS service in the 2/3G network 910, if only the information on the 4G cell (frequency) to which the UE returns is provided without consideration of the PLMN which the UE has connected previously, the UE may select a different PLMN (i.e. PLMN B) from the previously connected PLMN because the two PLMNs sharing the 4G network 920 use the same cell (frequency). The problem may become worse in the MSC is change during the CSFB procedure (when the UE is located at a boundary or moves).

In an embodiment, the UE informs a core network node (e.g., MSC) of the 2/3G network 910 of the PLMN with it has connected to the 4G network 920, and the core network node of the 2/3G network 910 generates configuration information recommending the use of the PLMN used previously to connect the 4G network 920 after the end of the CS service based on the received information. Although the description has been directed to the case of using the 2/3G network 910 and 4G network 920, the present disclosure is not limited thereto but may be embodied with other types of communication networks.

Figure 10:
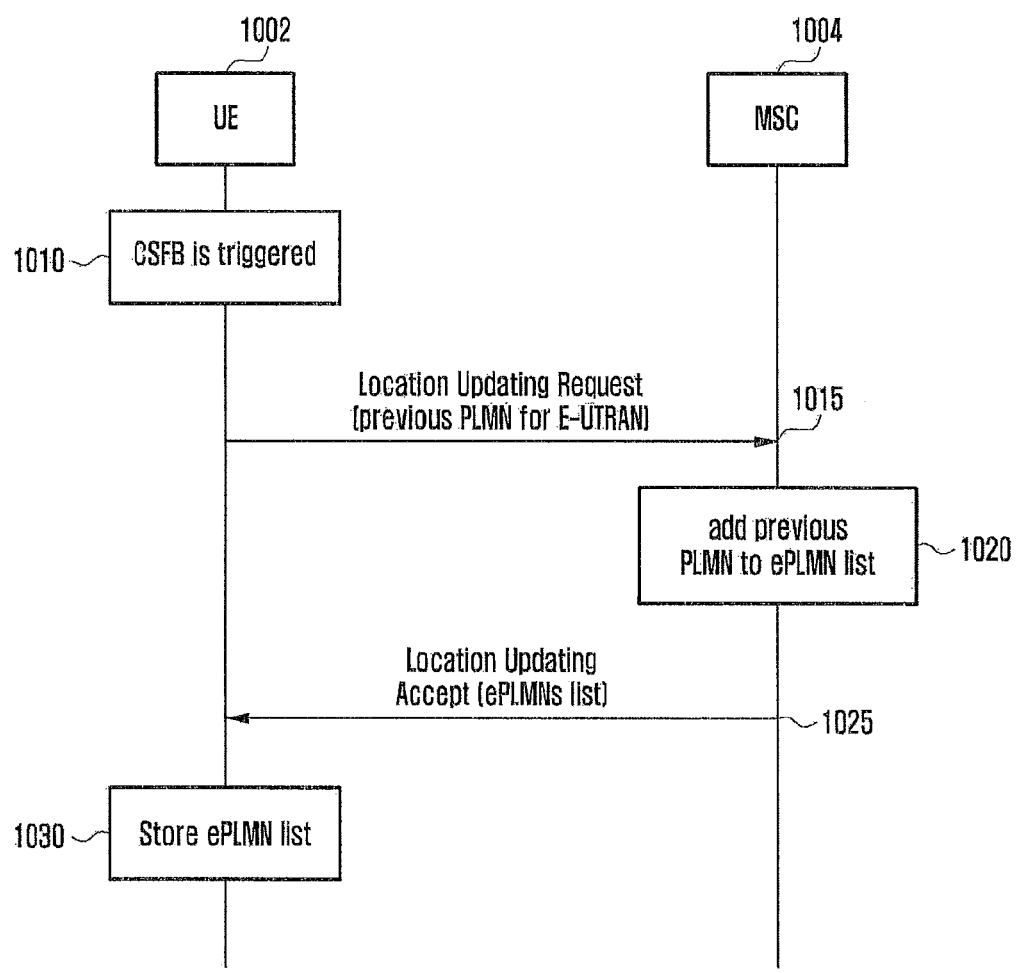
FIG. 10 is a diagram illustrating signal flows between UE and MSC according to an embodiment.

FIG. 10 is a diagram illustrating signal flows between UE and MSC according to an embodiment.

Referring to FIGS. 9 and 10, the UE 1002 has sent the 2/3G network 910 the information on the PLMN used for connection to the 4G network 920, and the core network node of the 2/3G network 910 generates and sends the configuration information for the UE to select the previously used PLMN when its returns to the 4G network 920 from the 2/3G network.

The UE 1002 may start CSFB at operation 1010. The CSFB may occur for various reasons, representatively for voice call in the CS domain.

The UE 1002 may send the MSC 1004 a Location Updating Request at operation 1015. The Location Updating Request may include the information on the previously used PLMN. The information included in the Location Updating Request may be used for E-UTRAN.

At operation 1020, the MSC 1004 may add the PLMN used by the UE 1002 to the equivalent PLMN (ePLMN) list based on the information received at operation 1015.

The MSC 1004 may send the UE 1002 a Location Updating Accept message at operation 1025. The Location Updating Accept message may include the ePLMN list.

At operation 1030, the UE 1002 may store the ePLMN list received at operation 1025. Afterward, the UE 1002 may attach a service network based on the stored ePLMN list.

In more detail, if it is necessary for the UE 1002 to perform Location Update during the CSFB procedure, the UE transmits the Location Updating Request message including the information on the PLMN used for connection to the 4G network 920 to the core network node (e.g. MSC/VLR) of the 2/3G network 910. At this time, the information for indicating the PLMN may be at least one of PLMN identity, GUTI, GUMMEI, and TAI. The core network node of the 2/3G network 910 may identify the PLMN used by the UE 1002 for connection to the 4G network 920 and thus recommend the UE 1002 returning to the 4G network 920 to select the previously use PLMN among the equivalent PLMNs. That is, when sorting the PLMNs equivalent to the PLMN used in 2/3G network, the PLMN used by the UE 1002 in the 4G network is included. If the 4G network 920 is shared, the other PLMNs sharing the 4G network 920, with the exception of the PLMN used previously by the UE 1002, may be excluded from the equivalent PLMN list to facilitate the PLMN selection of the UE. The equivalent PLMN list is sent to the UE 1002 in the Location Updating Accept message, and the UE 1002 stores the equivalent PLMN list for use in attaching to the 4G network.

Figure 11:
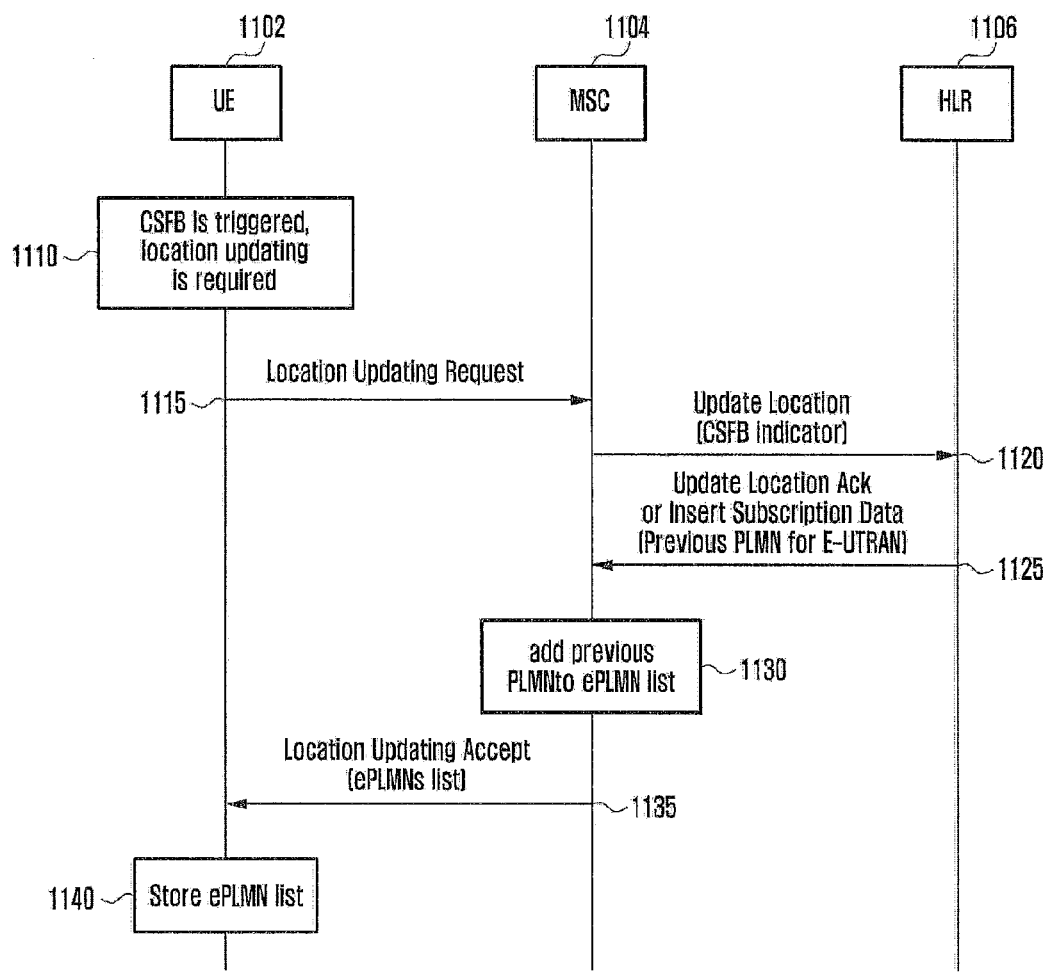
FIG. 11 is a diagram illustrating signal flows among UE, MSC, and HLR according to an embodiment.

FIG. 11 is a diagram illustrating signal flows among UE, MSC, and HLR according to an embodiment.

Referring to FIGS. 9 and 11, the core network node of the 2/3G network 910 acquires the information on the PLMN used by the UE in the 4G network 920 from the subscriber information server (HLR or HSS) during the UE location update and subscriber information acquisition procedure and transmits the configuration information generated based on the received information in order for the UE 1102 returning to the 4G network 920 to select the previously used PLMN.

The UE detect a CSFB trigger or Location Updating request at operation 1110. The CSFB is triggered for various reasons, representatively voice call in the CS domain.

The UE 1102 may send the MSC 1104 a Location Updating Request at operation 1115.

At operation 1120, the MSC 1104 sends the HLR 1106 an Update Location message based on the information received at operation 1115. The Update Location message may include a CSFB indicator or an identifier of the PLMN for use in the 4G network 920.

At operation 1125, the HLR 1106 may send the MSC at least one of Update Location Ack and Insert Subscription Data based on the message received at operation 1120. The message may include the information on the PLMN used previously by the UE 1102 for E-UTRAN.

At operation 1130, the MSC 1104 may add the PLMN used by the UE 1102 to the ePLMN list based on the information received at operation 1125.

The MSC 1104 may send the UE 1102 a Location Updating Accept message at operation 1135. The Location Updating Accept message may include the ePLMN list.

At operation 1140, the UE 1102 may store the ePLMN list received at operation 1135. Afterward, the UE 1102 may connect to a service network based on the stored ePLMN list.

In an embodiment, if it is necessary for the UE 1102 to perform Location Update during the CSFB procedure, the UE 1102 sends the core network node (e.g. MSC/VLR) of the 2/3G network 910 the Location Updating Request message. The core network node of the 2/3G network 910 may transmit to the HLR (or HSS) the Update location message including the indicator indicating that the UE is in the CSFB procedure or the identifier of the PLMN used by the UE in the 4G network 920. The HLR (or HSS) may transmit to the core network node of the 2/3G network 910 the Update Location Ack or the Insert Subscription Data message including the information on the PLMN used by the UE 1102 in the 4G network 920. The PLMN information may include at least one of MME identity, PLMN Identity, GUTI, GUMMEI, and TAI.

The core network node of the 2/3G network 910 may check the PLMN used by the UE 1102 in the 4G network 920 based on this information and so as to instruct the UE 1102 to select the previously used PLMN among the equivalent PLMNs in returning to the 4G network 920. That is, when generating the list of the PLMNs equivalent to the PLMN used in the 2/3G network 910, the PLMN used by the UE 1102 in the 4G network 920 may be included. If the 4G network 920 is shared, the other PLMNs sharing the 4G network 920, with the exception of the PLMN used previously by the UE 1102, may be excluded from the equivalent PLMN list to facilitate the PLMN selection of the UE 1102. The equivalent PLMN list is sent to the UE 1102 in the Location Updating Accept message, and the UE 1102 stores the equivalent PLMN list for use in attaching to the 4G network.

Figure 12:
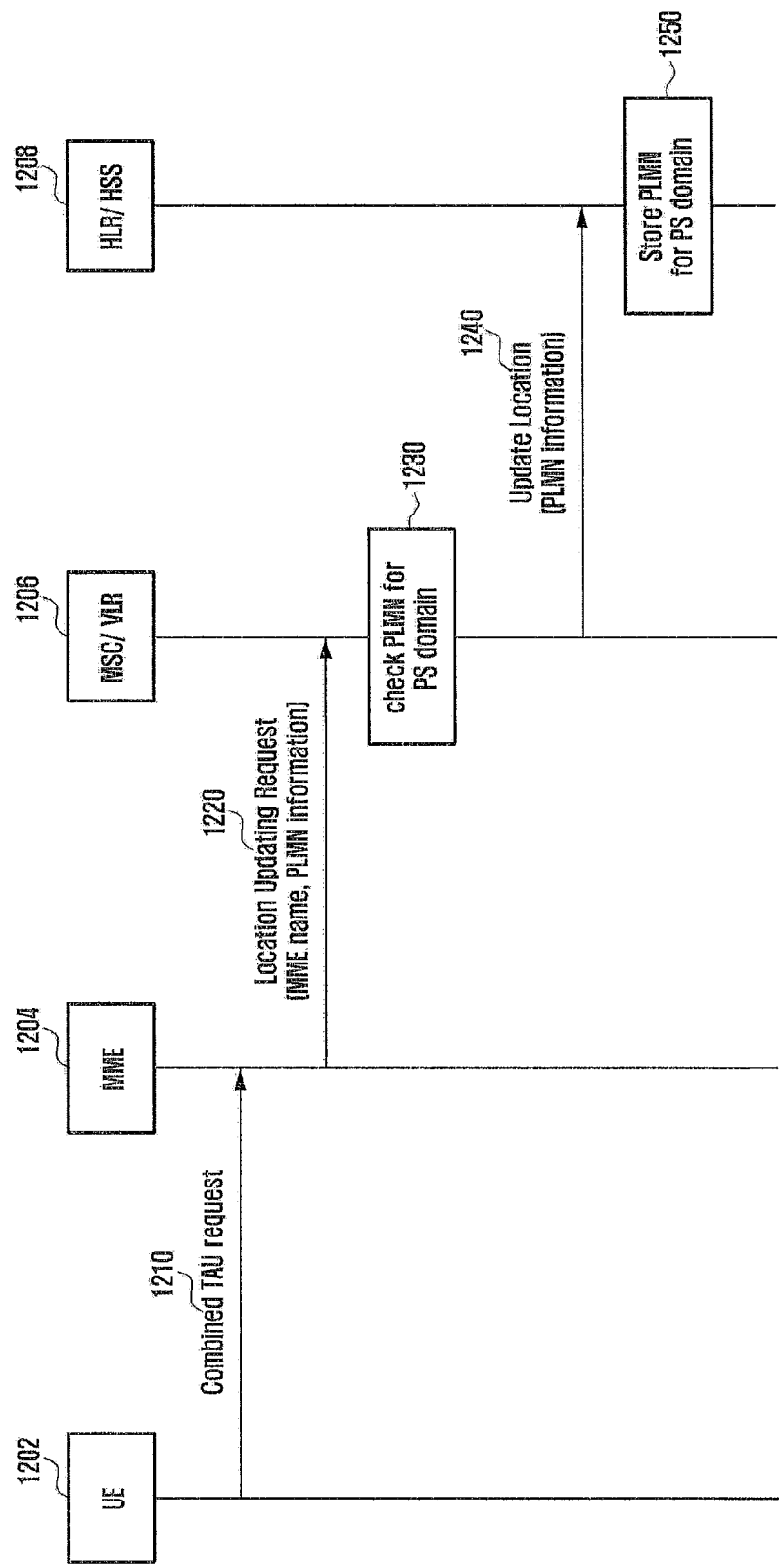
FIG. 12 is a diagram illustrating a pre-procedure to notify the HLR (HSS) of the PLMN used by the UE in the 4G network according to another embodiment.

FIG. 12 is a diagram illustrating a pre-procedure to notify the HLR (HSS) of the PLMN used by the UE in the 4G network in the embodiment described with reference to FIG. 11.

Referring to FIGS. 9 and 12, this procedure is performed before transmitting the PLMN information to the UE 1202 during the CSFB procedure. If the UE 1202 performs combined TA update procedure in the 4G network 920, the MME 1204 sends the UE 1202 the Location Update Request message including the information for use in identifying the PLMN with which the UE has been registered, e.g. PLMN ID, GUMMEI, and TAI.

The MSC/VLR 1206 may check the PLMN with which the UE 1202 has been registered based on the mapping information between the name of the MME 1204 and the PLMN. The MSC/VLR 1206 may send the HLR/HSS 1208 the Update location message including the information on the PLMN used by the UE 1202 in the 4G network 920, e.g. PLMN ID, GUMMI, and TAI. The HLR/HSS 1208 stores this information for configuring PLMN information in performing location update during the CSFB procedure.

In more detail, the UE 1202 may send the MME 1204 a combined TAU request at operation 1210.

At operation 1220, the MME 1204 sends the MSC/VLR 1206 the Location Update Request message generated based on the combined TAU request. The Location Update Request message may include the information for use in identifying the PLMN with which the UE has been registered, e.g. PLMN ID, GUMMEI, and TAI.

At operation 1230, the MSC/VLR 1206 may check the PLMN with which the UE 1202 has been registered based on the mapping information between the name of the MME 1204 and the PLMN included in the Location Update Request message or not configured.

At operation 1240, the MSC/VLR 1206 may send the HLR/HSS 1208 the update location message. The update location message may include the PLMN information of the UE 1202.

At operation 1250, the HLR/HSS 1208 may store the PLMN information of the UE 1202. The HLR/HSS 1208 may use PLMN information in location update during the CSFB procedure.

Throughout the present disclosure each of the UE and communication nodes may include a transceiver for communicating signals with other nodes and a control unit capable of checking the data transmitted/received through the transceiver.

It is to be appreciated that those skilled in the art can change or modify the embodiments without departing the technical concept of this disclosure. Accordingly, it should be understood that above-described embodiments are essentially for illustrative purpose only but not in any way for restriction thereto. Thus the scope of the disclosure should be determined by the appended claims and their legal equivalents rather than the specification, and various alterations and modifications within the definition and scope of the claims are included in the claims.

Although preferred embodiments of the disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

The invention claimed is:

1. A network connection method by a terminal in a communication system, the method comprising:
  receiving, from a server, a first message including information on a registration order among at least one domain corresponding to a network, the at least one domain comprising a packet switched (PS) domain and a circuit switched (CS) domain, the information on the registration order being identified based on a supported function corresponding to the network, the information on the registration order including information for a priority among the PS domain, the CS domain, and combined both the PS domain and the CS domain;
  identifying a domain for a connection based on the information on the registration order;
  transmitting, to an entity of the network, a second message including information on a service required for the terminal and a request for the connection based on the identified domain for the connection;
  receiving, from the entity of the network, a response message based on the information on the service, the response message including comprising information on a function supported by a connected domain of the terminal; and transmitting, to the entity of the network, a fourth message including an additional request for a connection based on the information on the function supported by the connected domain of the terminal.

2. The method of claim 1, further comprising:
transmitting, to the server, a third message related to an initial attach for connection to the network.

3. The method of claim 1, wherein the server comprises an open mobile alliance device management (OMA-DM) server.

4. A terminal connecting to a wireless communication system, the terminal comprising:
a transceiver configured to receive and transmit at least one signal; and
a controller electrically coupled to the transceiver and configured to:
control the transceiver to receive, from a server, a first message including information on a registration order among at least one domain corresponding to a network, the at least one domain comprising a packet switched (PS) domain and a circuit switched (CS) domain, the information on the registration order being identified based on a supported function corresponding to the network, the information on the registration order including information for a priority among the PS domain, the CS domain, and combined both the PS domain and the CS domain;
identify a domain for a connection based on the information on the registration order;
control the transceiver to transmit, to an entity of the network, a second message including information on a service required for the terminal and a request for the connection based on the identified domain for the connection;
control the transceiver to receive, from the entity of the network, a response message based on the information on the service, the response message including information on a function supported by a connected domain of the terminal; and
control the transceiver to transmit, to the entity of the network, a fourth message including an additional request for a connection based on the information on the function supported by the connected domain of the terminal.

5. The terminal of claim 4, wherein the controller is further configured to control the transceiver to transmit, to the server, a third message related to an initial attach for connection to the network.

6. The terminal of claim 4, wherein the server comprises an open mobile alliance device management (OMA-DM) server.

7. A method by an entity of a network in a communication system, the method comprising:
receiving, from a terminal, a first message including information on a service required for the terminal and a request for a connection corresponding to a domain identified based on information on a registration order among at least one domain corresponding to the network, the information on the registration order including information for a priority among a packet switched (PS) domain, a circuit switched (CS) domain, and combined both the PS domain and the CS domain, the at least one domain comprising the PS domain and the CS domain, the information on the registration order being identified based on a supported function corresponding to the network;
identifying information on a function supported by a connected domain of the terminal based on the first message;
transmitting, to the terminal, a response message based on the information on the service, the response message including the information on a function supported by a connected domain of the terminal; and
receiving, from the terminal, a second message including an additional request for a connection based on the information on the function supported by the connected domain of the terminal.

8. The method of claim 7, wherein an initial attach for connection to the network is transmitted from the terminal to a server related to the information on the registration order.

9. The method of claim 8, the server comprises an open mobile alliance device management (OMA-DM) server.

10. An apparatus of an entity of a network in a communication system, the apparatus comprising:
a transceiver configured to receive and transmit at least one signal; and
a controller electrically coupled to the transceiver and configured to:
control the transceiver to receive, from a terminal, a first message including information on a service required for the terminal and a request for a connection corresponding to a domain identified based on information on a registration order among at least one domain corresponding to the network, the information on the registration order including information for a priority among a packet switched (PS) domain, a circuit switched (CS) domain, and combined both the PS domain and the CS domain, the at least one domain comprising the PS domain and the CS domain, the information on the registration order being identified based on a supported function corresponding to the network;
identify information on a function supported by a connected domain of the terminal based on the first message;
transmit, to the terminal, a response message based on the information on the service, the response message including the information on a function supported by a connected domain of the terminal; and
receive, from the terminal, a second message including an additional request for a connection based on the information on the function supported by the connected domain of the terminal.

11. The apparatus of claim 10, wherein an initial attach for connection to the network is transmitted from the terminal to a server related to the information on the registration order.

12. The apparatus of claim 11, the server comprises an open mobile alliance device management (OMA-DM) server.

* * * * *